Feb. 18, 1969     G. E. BOETTCHER     3,428,894

REVERSIBLE ELECTROCHEMICAL COULOMETER

Filed Nov. 2, 1966

*INVENTOR.*
Gordon E. Boettcher
BY

United States Patent Office 3,428,894
Patented Feb. 18, 1969

3,428,894
REVERSIBLE ELECTROCHEMICAL COULOMETER
Gordon E. Boettcher, Albuquerque, N. Mex., assignor to the United States of America as represented by the United States Atomic Energy Commission
Filed Nov. 2, 1966, Ser. No. 591,657
U.S. Cl. 324—94　　　　　　　　　　　　　　　　8 Claims
Int. Cl. G01r 27/22

Coulometers are well-known as instruments for measuring electrical quantities by means of the chemical action produced in an electrolytic cell. In the cell, electrolysis takes place when an electric current is passed through an electrolyte between two conducting electrodes. Metal ions from one of the electrodes, usually the anode, go into the electrolyte to replace like ions therein which are deposited on the other electrode, usually the cathode.

The laws governing electrolysis, derived by the English physicist Faraday, may be stated as follows:

(1) The mass or quantity of any substance deposited on or liberated from an electrode during electrolysis is proportional to the quantity of electricity that passes through the electrolyte.

(2) The mass or quantity of different substances deposited on or liberated from an electrode by the same quantity of electricity is proportional to the equivalent weights of the substances.

According to the first law there is a relationship between the amount of current passing through the electrolyte and the amount of substance transferred from one electrode to another. The second law indicates that there is a relationship between the equivalent weight of a substance deposited or liberated and the current passing through the electrolyte. The amount or quantity of electricity may be expressed in coulombs (amp-seconds) or merely as a current and time function. Thus for any given substance, such as silver, as used herein, the same quantity of electricity (the number of coulombs or the product of current and time) will cause the same amount of the substance to be transferred from one electrode to another. It may be seen, therefore, that knowing any two of the three variables, current, time, or amount of material transferred, one may calculate the third variable or the unknown. Moreover, it may be seen that if it is possible to reverse the deposition procedure, it may be possible to find the area under a variable current versus time curve or to determine a quantity of material transferred or to determine the length of time elapsed between two events. Or, given a fixed quantity of depositant material to transfer between electrodes and given a constant current source, it may be seen that a device may be used as a timer. A reversible mode may thus extend the time capability. It may further be seen that an etxended shelf life, or the ability of a coulometer to be free from the decomposition of its electrolyte and the electrodes therein over an extended period of time, and the ability of such a coulometer to operate over a wide temperature range, may greatly enhance its usefulness.

It is an object of this invention to provide a novel coulometer.

It is another object of this invention to provide a novel silver electrochemical coulometer.

It is another object of this invention to provide a reversible silver electrochemical coulometer.

It is another object of this invention to provide a coulometer which will operate over a wide temperature range.

It is another object of this invention to provide a coulometer which will operate with a long shelf or storage life.

It is another object of this invention to provide a coulometer which may be used as a timer.

It is another object of this invention to provide a coulometer which may be used as an integrator.

Figure 1:
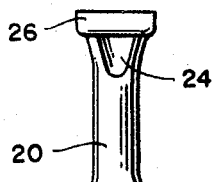
FIGURE 1 is a sectional view of a coulometer as described herein.

FIGURE 1 shows the physical embodiment of a reversible silver electrochemical coulometer. The coulometer may comprise a tubular or generally cylindrical housing 10 comprised of glass or other appropriate material having a generally conical portion 12 extending into the cylindrical housing from a base portion 14 to form a closure for one end of the cylindrical housing or chamber 10. The top of the cylinder may be closed by an upwardly sloping portion 16, generally parallel to the conical portion 12, which may include an aperature for a fill tube 20. The fill tube may be sealingly bonded or affixed to the sloping portion 16.

The fill tube 20 may be fabricated from a metal which will not react with the electrolyte within the cylinder. With the electrolyte used herein, described infra, a noble metal, such as platinum, may preferably be used. Platinum is also recommended, among other reasons, for its ease of bonding to glass. The fill tube 20 may be pinched as at 22 after the cylinder is filled. While the pinch may substantially close off the tube, due to characteristics of the metal, a complete sealing of the tube is usually not accomplished and a complete seal-off at 24 may be required. Since a cold weld will usually not take place in a platinum tube, it is preferable to deposit a gold cap 26 over the seal-off 24. If a glass fill tube is used, a double pinch and a gold or other metal cap may not be necessary.

Extending through the conical base portion 14 at or near its apex may be two spaced apart electrodes, 30 and 32, each of which may have a crook shaped configuration to provide increased surface area in a small amount of space. The configuration is not critical to the success of the coulometer as long as the electrodes are maintained wholly within the electrolyte. The electrodes may preferably be of a noble metal, such as platinum. Platinum is recommended to facilitate the sealing or bonding of the electrodes and the glass. A gold coating may preferably be plated on the electrodes because the silver plates to gold more readily than it does to platinum. Neither the gold coating on both electrodes nor a silver coating on one electrode is shown.

The cylinder or housing 10 may be filled with an electrolyte 40 through fill tube 20. An expansion bubble 42 may be provided to preclude physical damage due to expansion of the electrolyte under extreme temperature conditions. Due to the size of the bubble 42 and the surface tension of the electrolyte, the bubble will generally not enter fill tube 20. The conical portion 12 of the base prevents the bubble from contacting the electrodes when the cylinder is inverted. The upwardly sloping portion prevents contact with the bubble when the device is upright, and when the device is horizontal the spacing between the electrodes and the tubular wall portions of the chamber precludes contact. Thus regardless of the attitude or orientation of the coulometer, the electrodes may remain completely immersed in the electrolyte 40 and may be free from contact with the expansion bubble 42. If the bubble were to contact either or both electrodes during electrolysis, accuracy of the device would be impaired.

After the electrolyte has been introduced into the cylinder 10 a temporary silver electrode (not shown) may be inserted through fill tube 20 and into the electrolyte 40. With the application of a positive potential to the temporary electrode and with the application of a negative potential to one of the electrodes, e.g., electrode 30, silver from the temporary electrode may plate onto the electrode 30. The amount of silver plated may be controlled or determined, according to Faraday's Laws, by controlling the current and time or duration of plating. After the desired or predetermined amount has been plated onto the electrode 30, the circuit may be opened, thus discontinuing the current and the plating, and the temporary electrode may be withdrawn. The fill tube may then be sealed and capped as previously described. To insure optimum operation, the platinum, the silver, and the gold should be of a purity of about 99.999%.

The novel electrolyte used in the coulometer may consist of about 100 grams of doubly distilled water, about 0.25 gram of sulfuric acid (reagent grade, 95–98%), and about 1.5 grams of silver perchlorate. This electrolyte appears to be capable of storage for periods of greater than five years and in temperatures ranging from about $-55°$ C. to about $+75°$ C. with substantially no chemical or physical deterioration. Moreover, the electrolyte may permit operation of the coulometer with an accuracy of better than 2% over a useful temperature range of from about 10° C. to about 125° C. with input currents ranging from a few microamps to about one thousand microamps and over a time span of from about 1 second to many hours.

Perhaps the outstanding feature of the electrolyte, and thus the device, is that of reversibility. Coulometers heretofore have been characterized as being able to plate only from one electrode to the other; the process has generally not been completely and accurately reversible. However, using the novel silver perchlorate and sulfuric acid electrolyte described herein the electrolytic plating process may be substantially completely and accurately reversible. This reversibility provides the coulometer with the capability of functioning as an integrator and as a recirculating timer. It appears that the sulfuric acid may provide the coulometer with the reversibility characteristics. Generally, when silver has been plated onto an electrode, it does not deplate from that electrode and replate onto the original electrode. However, the use of sulfuric acid with the silver perchlorate seems to allow the silver to come off the plated electrode after it has been plated on.

Figure 2:
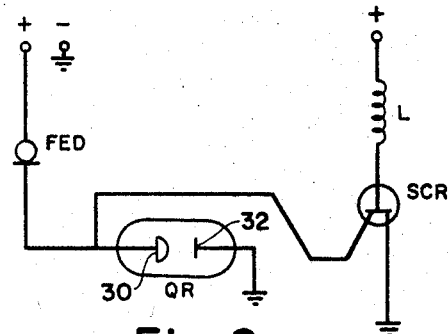
FIGURE 2 is a schematic circuit diagram incorporating the coulometer as described herein.

A circuit embodying the coulometer is shown in FIG. 2. A source of positive voltage (e.g., +8 volts) may be connected through a field effect diode FED or some other constant current regulator to the anode 30 of a coulometer QR; the cathode 32 of the coulometer may be grounded. A lead may connect the anode to the gate terminal of a silicon-controlled rectifier SCR, and another source of positive voltage, such as +8 volts, may be connected through a relay coil L to the emitter terminal of the SCR.

Figure 3:
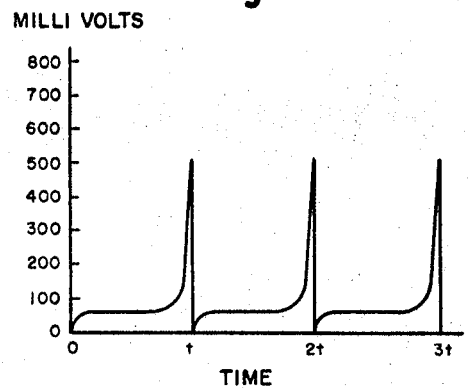
FIGURE 3 is a graph showing the electrical characteristics of a reversible coulometer.

As the current moves through the coulometer silver ions may transfer from anode 30 to the electrolyte and silver ions from the electrolyte may transfer to the cathode 32. FIGURE 3 shows voltage plotted against time for a coulometer. For the circuit in FIG. 2 only one cycle, from $o$ to $t$, is applicable. As the silver transfers to the cathode the voltage drop across the cell may level off at about 50 millivolts. However, as the last of the silver plates onto the cathode, the voltage drop across the coulometer may rise abruptly to about 500 millivolts. This voltage may be fed to the gate of the SCR, allowing it to conduct. The current from the voltage source may then actuate the relay coil which in turn may actuate another device or may perform some desired function. By predetermining the amount of silver on the anode and the current moving through the coulometer, the time may be accurately controlled.

Figure 4:
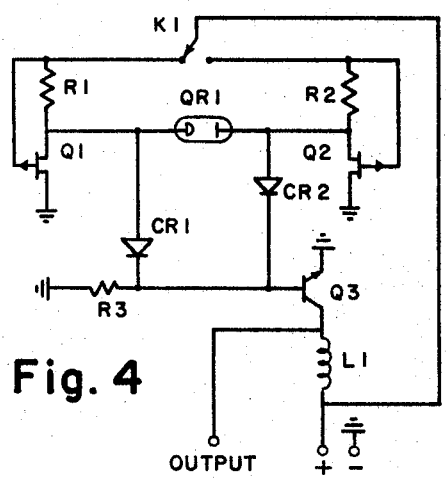
FIGURE 4 is a schematic circuit diagram using the coulometer in a reversible mode.

A recirculation mode may be provided by the circuit of FIG. 4. This recirculation mode is made possible by the reversible characteristics of the coulometer. With relay K1 in the position shown current from the voltage source may flow through R1, through the coulometer QR1, and through field effect transistor Q2 to ground. FET Q1 will be off, Q3 will be off, and no current will flow through CR1 or through CR2. When the rated charge has passed through QR1, as previously described, the voltage across it may rise. This voltage rise may be passed through CR1 and may turn on Q3, allowing Q3 to conduct, and current from the voltage source may then pass through relay coil L1 (and through an output terminal if desired). In this circuit, the relay coil may be connected to relay K1 and it may switch the relay, reversing the current through the coulometer.

The current from the voltage source may then flow through R2, QR1, and through Q1 to ground. When the silver has been plated from the new anode (the cathode of the first cycle) to the new cathode (the anode of the first cycle), the voltage rise across the coulometer will then feed through CR2 and will turn on Q3, actuating coil relay L1 and causing an output pulse. The relay may again reverse the current through K1 to QR1 and another cycle may commence.

As long as the current through QR 1 remains constant the time for each cycle will remain the same, and the repeating waveform shown in FIG. 3 will be created. As in the prior example, the duration of each period may be established according to the constant current supplied and to the initial amount of the silver charge on an electrode in the coulometer. The current flow through QR1 is kept constant for each cycle, that is, plating from one electrode to the other, by the field effect transistors Q1 and Q2.

The theory for using the coulometer as an integrator may be derived from Faraday's Laws of Electrolysis, which have been discussed previously. The amount of silver (in grams) plated from one electrode to another electrode during the passage of a variable current $i$ for a time $t$ may be represented according to the equation $$g = k\int i\,dt$$

where $k = M/jF$

N=molecular weight of silver
$j$=valence of silver
$F$=Faraday's constant, 96,494 coulombs The equation may also be expressed $$g/k = \int i\,dt = It$$

The area under a current time curve may be represented by the equation $$Q = \int i\,dt = It$$

where

Q=coulombs
$i$=current
$t$=time

The relationship between the two equations may readily be seen. Thus understanding the relationship between the amount of charge transferred during electrolysis and the quantity of current used therefore, it may be seen how the coulometer may be used as an integrator in its reversible mode.

Figure 5:
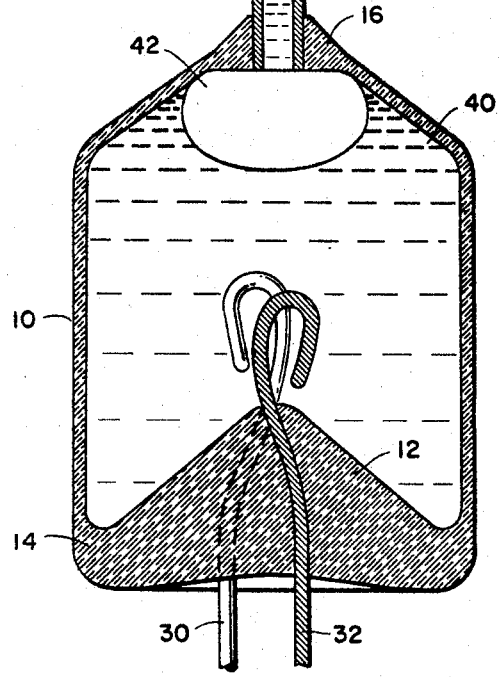
FIGURE 5 comprises a series of graphs plotting current against time.
Figure 5:
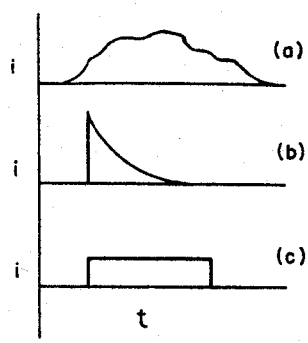

FIGURE 5 comprises 3 different graphs, labeled $a$, $b$, and $c$, each of which plots current versus time. The graphs may serve to illustrate the use of the coulometer as an integrator. The coulometer, in a reversible mode, may be used to measure the area under a current-time curve, which may be expressed in coulombs. It may be used, with a variable current, to find the quantity of electricity in coulombs, or, with a constant current, it may be used to determine time.

In FIGS. 5(a) and 5(b) the current varies throughout the time $t$. The area under the curve may be calculated according to the equation $Q = \int i\,dt$, as explained above.

Thus, if during time $t$ a quantity of silver is plated from the anode 30 to the cathode 32 by a variable, unknown current, the amount of charge in coulombs (Q) required for the transfer may be determined by reversing the current and deplating the silver from electrode 32 and replating it on electrode 30 using a constant known current. The completion of the replating procedure will be signalled by a voltage rise, as indicated in FIG. 3. The product of the constant current and the time will thus give the coulombs, or the area under the curve.

In FIG. 5(c) a constant current is plotted against time. By reversing the coulometer the area under the curve may be calculated as described above, or, by using the same current, if it is known, in the reverse cycle, an unknown time $t$ may be determined.

If desired, a coulometer may contain a plurality, or more than two, electrodes (not shown). The electrical circuitry associated therewith could include relays for plating from one electrode to another, and to another, etc., rather than back and forth (30 to 32, 32 to 30, etc.) as previously described. Or, if variable time periods are required, and it is desired to use a constant current, more than one electrode may be initially plated with silver, each of a different predetermined amount to correspond to the different time periods desired. In the latter case, a voltage pulse signalling the end of one electrolysis period (e.g., between 30 and 32) may be used to begin electrolysis between another pair of electrodes (i.e., other than 30 and 32) having a different time period.

It may be seen that the device described herein comprises a novel reversible coulometer which has a variety of uses, such as, for example, a timer or an integrator. The coulometer may also function regardless of position or orientation because of its novel physical embodiment or design. The novel electrolyte not only provides the coulometer with the capability of substantial and accurate reversibility, but it also permits accurate operation (within two percent) over a wide temperature range and over a long period of time.

I claim:

1. An electrochemical coulometer comprising, in combination, a tubular chamber, a base portion, a generally conical portion extending into the chamber from the base portion, said base and conical portions providing a closure for one end of the chamber, an upwardly sloping portion generally parallel to the conical portion extending from the tubular chamber providing a closure for another end of the chamber, an aperture in the upwardly sloping portion, a fill tube extending from the aperture for filling said chamber with an electrolyte, at least a pair of electrodes extending through said conical portion and into said chamber, one of said electrodes having a predetermined amount of metal plated thereon for transfer to the electrolyte and from the electrolyte to the other electrode, an electrolyte substantially filling said chamber for conducting electrolysis between the electrodes, and forming an expansion bubble within said chamber for preventing damage to the coulometer due to expansion of the electrolyte, and said conical portion and said upwardly sloping portion preventing said bubble from contacting the electrodes in any orientation of the coulometer.

2. The coulometer of claim 1 which includes an electrical circuit connected between said pair of electrodes, including a source of current for sustaining electrolysis within the chamber.

3. The coulometer of claim 1 in which the metal plated on an electrode is silver and the electrolyte comprises silver perchlorate, sulfuric acid, and distilled water.

4. The coulometer of claim 3 in which the electrodes are made of a noble metal.

5. The coulometer of claim 4 which includes a plurality of electrodes.

6. The coulometer of claim 5 in which more than one electrode has a predetermined amount of silver thereon.

7. The coulometer of claim 6 in which the fill tube comprises a noble metal tubular member having a pinch between the chamber and the outer end of the tube to substantially seal the fill tube.

8. The coulometer of claim 7 which includes a seal-off at the outer end of the tube to seal said tube, and said seal-off includes a metallic cap covering said seal-off.

References Cited
UNITED STATES PATENTS

| | | | |
|---|---|---|---|
| 2,655,634 | 10/1953 | Kroko | 324—94 X |
| 2,945,179 | 7/1960 | Winn | 324—94 X |
| 3,210,662 | 10/1965 | Steinmetz et al. | 324—94 |

RUDOLPH V. ROLINEC, *Primary Examiner.*

C. F. ROBERTS, *Assistant Examiner.*

U.S. Cl. X.R.

324—68